United States Patent [19]

Smith

[11] Patent Number: 5,324,160
[45] Date of Patent: Jun. 28, 1994

[54] TILTABLE TRAILER FOR LOADING, UNLOADING AND TRANSPORTING CONTAINERS

[76] Inventor: Bud Smith, 522-1/2 B W. McKellips, Mesa, Ariz. 85201

[21] Appl. No.: 934,198

[22] Filed: Aug. 24, 1992

Related U.S. Application Data

[63] Continuation-in-part of Ser. No. 604,956, Oct. 22, 1990, abandoned.

[51] Int. Cl.⁵ .............................................. B65G 67/02
[52] U.S. Cl. ................................ 414/475; 280/149.2; 414/494; 414/500
[58] Field of Search ............... 414/475, 498, 480, 482, 414/483, 484, 494, 500, 491; 280/149.2, 405.1, 475, 763.1, 764.1, 765.1, 766.1; 180/209; 410/18, 144, 149; 220/1.5, 503, 505, 23.83

[56] References Cited

U.S. PATENT DOCUMENTS

| | | | |
|---|---|---|---|
| 2,717,707 | 9/1955 | Martin | 414/475 |
| 3,376,987 | 4/1968 | Lohse | 414/500 X |
| 3,385,459 | 5/1968 | Wellman, Jr. | 414/498 |
| 3,541,598 | 11/1970 | Dousset | 414/498 X |
| 3,624,786 | 11/1971 | Lundahl | 414/475 |
| 3,749,363 | 7/1973 | Hauser | 414/498 X |
| 3,801,177 | 4/1974 | Fylling et al. | 220/1.5 X |
| 3,934,740 | 1/1976 | Rumell | 414/484 |
| 3,966,075 | 6/1976 | Schultz | 220/1.5 |
| 4,130,211 | 12/1978 | Abascal | 414/475 |
| 4,332,515 | 6/1982 | Twyman | 410/149 |
| 4,357,059 | 11/1982 | Mittelmann | 220/1.5 X |
| 4,693,650 | 9/1987 | Smith | 410/18 X |
| 4,797,049 | 1/1989 | Gearin et al. | 410/18 X |
| 4,834,608 | 5/1989 | Middaugh et al. | 410/18 X |
| 4,919,445 | 4/1990 | Robey | 280/149.2 |

Primary Examiner—David A. Bucci
Attorney, Agent, or Firm—Gregory J. Nelson

[57] ABSTRACT

A tiltable trailer and container system having a trailer with a tilt frame. When a container on the frame is released or coupled from the trailer it will move rearwardly under the influence of gravity to an off-loading position. The container is loaded by a winch and cable attachable to the container to roll the container onto the trailer. The container is provided with removable or selectively positionable wheels or rollers. The system also includes cartons which are stackable in the container for containment of freight and household items.

13 Claims, 8 Drawing Sheets

TILTABLE TRAILER FOR LOADING, UNLOADING AND TRANSPORTING CONTAINERS

This is a continuation-in-part of Ser. No. 07/604,956, filed on Oct. 22, 1990 entitled "Tiltable Trailer for Loading, Unloading and Transporting Containers", now abandoned.

The present invention relates to trailers and more particularly to an improved tiltable trailer system for transporting freight containers. Trailers of this general type are sometimes referred to as trailers for roll-on, roll-off containers.

In the residential and commercial moving industry there are several traditional approaches to moving personal and business possessions and equipment. One approach is to engage a commercial mover who will pack and transport the items in a truck and trailer. On the other hand, many individuals and businesses prefer the "do it yourself" approach and to this end will rent or lease a truck for this purpose. Rental trucks of this type are generally provided with some type of ramp which may be attached or extends from the truck bed to facilitate loading and unloading of the truck body.

Another approach that has found acceptance is the use of large containers of the type similar to sea cargo containers. Such containers provide an economical method for moving items and can also be used for temporarily storing the goods. Typically the storage container is transported to a site such as to the home or business and is unloaded and left for a period of time during which period the container is loaded. Once loaded, the container is transported to a new location for unloading or storage.

One particular problem of adapting these large containers to moving and storage use is the problem of handling these containers. Loading and unloading such containers which may measure 10'(H)×40'(L) and have a tare weight of 9,000# is formidable. Typically, in the transportation industry, loading and unloading of the containers is accomplished by fork lift or other similar industrial lifting equipment.

Other approaches for loading large containers which have been used in the container trucking industry involve the use of detachable container systems of the type which are known as roll-on, roll-off arrangements. Various patents covering such type of arrangements can be found in the prior art.

For example, the early patent to Jackson et al, U.S. Pat. No. 1,442,769 shows a truck or vehicle with a tilting platform. The vehicle has a winch which may be utilized to pull a vehicle or other load up the runway of the platform.

Various other patents show tiltable trailers of the general type having cable systems for pulling the container onto the tilt frame and for off-loading the container. Typical of these are U.S. Pat. Nos. 3,964,626; 4,051,968; 4,704,062 and 4,702,622.

U.S. Pat. No. 4,645,405 shows a handling mechanism for roll-off containers including elongated lift frame pivotally connected to a truck chassis with hydraulic tilt rams. This patent contains a general discussion of systems of the type above which are generally classified as roll-on, roll-off trailers.

U.S. Pat. No. 4,656,406 shows a container loader and transport assembly having a horizontal bed with a loader assembly. The loader is movable mounted to the bed and includes a carriage and lifting mechanism mounted to the carriage. The loader is constructed to life the container and lower it while maintaining the container in substantially a horizontal position.

U.S. Pat. No. 3,934,740 discloses an improved over-the-road transport vehicle and method of unloading a cargo container. The transport vehicle has a chassis having a wheeled tandem support and a flatbed that is selectively positionable relative to the tandem and which may be tilted on the tandem to permit the container support to be moved longitudinally off the flatbed to an adjacent surface. The container is rectangular in shape and has extensible and retractable support dollies to convert the container from an immobile frame-based storage container to a mobile wheel-hauling container for convenient placement onto and off of the chassis flatbed.

While the above systems provide certain advantages, they generally have certain drawbacks. One drawback is that many must be powered by specially constructed single purpose trucks. A further disadvantage of prior art devices is that they often require specially designed and built containers. Also, the tilting mechanisms are often complicated, expensive to build and difficult to operate.

Therefore, there exists a need for an effective, tiltable trailer for transporting roll-on, roll-off containers that would be usable with conventional containers such as sea cargo containers to adapt such container for use as personal and commercial moving and storage units.

Further, it is an object of the present invention to provide a tiltable trailer for transporting containers by conventional trucks.

It is another object of the present invention to provide a tiltable trailer which is simple, inexpensive to manufacture and easy to operate.

It is another object of the present invention to provide a trailer and container system which is adaptable for use for both business and residential storage moving.

Another object of the present invention is to provide a tiltable trailer and container system in which when the container is placed on site locates the container floor close to ground level for the convenience of loading and unloading.

It is another object to provide a roll-on, roll-off container with removable or extensible wheels or dollies for convenient loading and unloading.

Another object of the present invention is to provide a tiltable trailer and container system having power means associated with the trailer for loading the container.

It is another important object of the present invention to provide a tiltable trailer or container system which is rearwardly tiltable for off-loading the container in response to positioning of the container on the trailer.

Other objects and advantages of the present invention will become more apparent from the following description taken in conjunction with the drawings in which.

Briefly, the present invention relates to a tiltable trailer and container system having a tilt-back trailer which can be hitched to a conventional tractor truck. The trailer has a main chassis supported on a carriage having pneumatic tires. A tilt frame is pivotally connected to the main trailer chassis at an intermediate location. In the normal trailer traveling or towing position, the tilt frame is slightly rearwardly inclined. When the container is released and rolls rearwardly on guide tracks on the trailer during unloading, the tilt frame will, due to the weight of the container, tilt rearwardly to an off-loading position. To facilitate loading and unloading the trailer is provided with a cable winch at the front end and the roll-on, roll-off container is provided with removable rollers or wheels at the four corners of the container. A typical container is of a construction similar to sea-worthy or sea-going cargo containers.

In operation, the trailer is utilized to transport the container to a site. At the site, the cable winch is released allowing the container to roll rearwardly to cause the tilt trailer to tip rearwardly so the container may be off-loaded. Once on the ground, the opposite ends of the trailer may be elevated by hoists or jacks and the container rollers disengaged and the container lowered and left on site. The truck and trailer may be used for other purposes. When the container has been loaded, the truck and trailer are returned to the site and the container hoisted to install the rollers at the corners of the container. The container is then connected to the winch cable attached to the winch on the trailer and when the winch is actuated, the container is rolled forwardly to the loaded position along the tilt frame. As the container moves forwardly on the tilt trailer, the tilt trailer will, when a predetermined position is reached, tilt to the towing position due to the weight of the container.

Turning now to the drawings, the trailer and container system of the present invention is generally designated by the numeral 10 which includes a container 12 and a tiltable trailer 14 which is towable by a truck 16.

The container 12 as shown is generally rectangular and preferably being of steel construction having side walls 20 and 22, top 24, floor 26, front wall 28 and rear wall 30. The rear wall 30 is typically provided with one or more doors 32 which may be hinged to open or may be of the shutter type mounted on a track which may be raised to provide access to the interior compartment 34 of the container. Containers of this type come in various standard sizes as for example 10'×10" and being 20' to 40' in length and are sometimes designated sea containers. It is noted that when the container is on a surface as shown in FIG. 3, the floor 26 is only above the supporting surface a distance approximately corresponding to the thickness of the floor.

Figure 3:
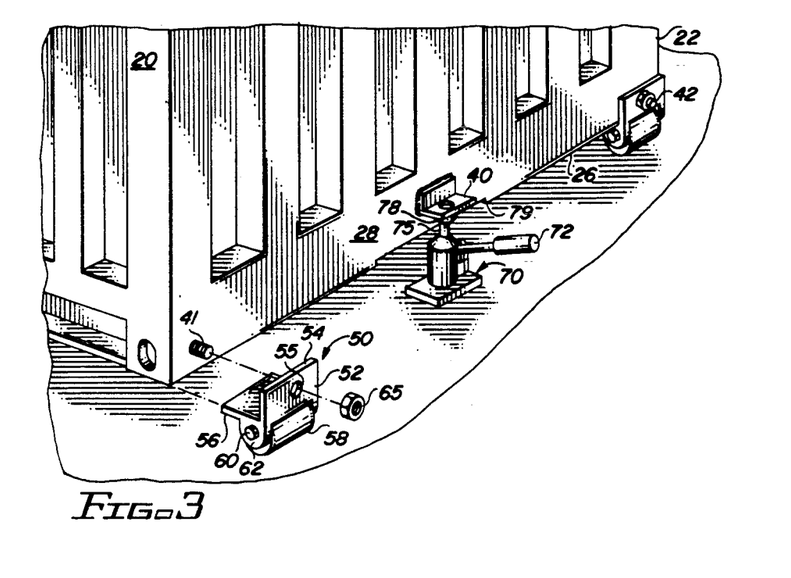
FIG. 3 is a partial perspective view of a front end of the container showing the removable rollers and hydraulic jack for raising and lowering the container.

FIG. 3 illustrates the front wall 26 of the container. Opposite lower edges of the front wall are provided with mounting means shown in the form of threaded studs 41 and 42 which are welded or otherwise secured to the lower edge of the container front wall extending horizontally forwardly. Each of the mounting means 41 and 42 is adapted to removably receive a roller assembly 50. The roller assembly includes an angle bracket 52 having a vertical flange member 54 and horizontal flange member 56. The vertical flange member 54 defines a bore 55 which is located so the bracket may be positioned with the mounting member 44 extending through the bore and the horizontal flange 56 engaging the exterior of the floor 26 of the container. Each roller assembly includes a wheel or roller 58 having an axially extending shaft 60 received in ear members 62 depending at opposite sides of the horizontal flange 56. The roller assemblies are held in place by retainer members 65 shown as a nut threadably engageable on fastener member 41.

As will be more fully explained hereafter, the container may be elevated by a lift mechanism 70 shown as a hydraulic bottle jack having manually operable lever 72 which serves to raise or lower the jack shaft 75. The jack has been modified to include a horizontally extending lift plate 78 connected to jack shaft 75 so that in the lowered position, the lift plate may be engaged beneath the front and rear walls of the container to lift the container. Preferably, front and rear walls are provided with a clearance space 79 to permit insertion of the lift plate.

The opposite lower edges of the rear container 30 wall are also provided with roller assemblies 50 as have been described with reference to FIG. 3.

Figure 4:
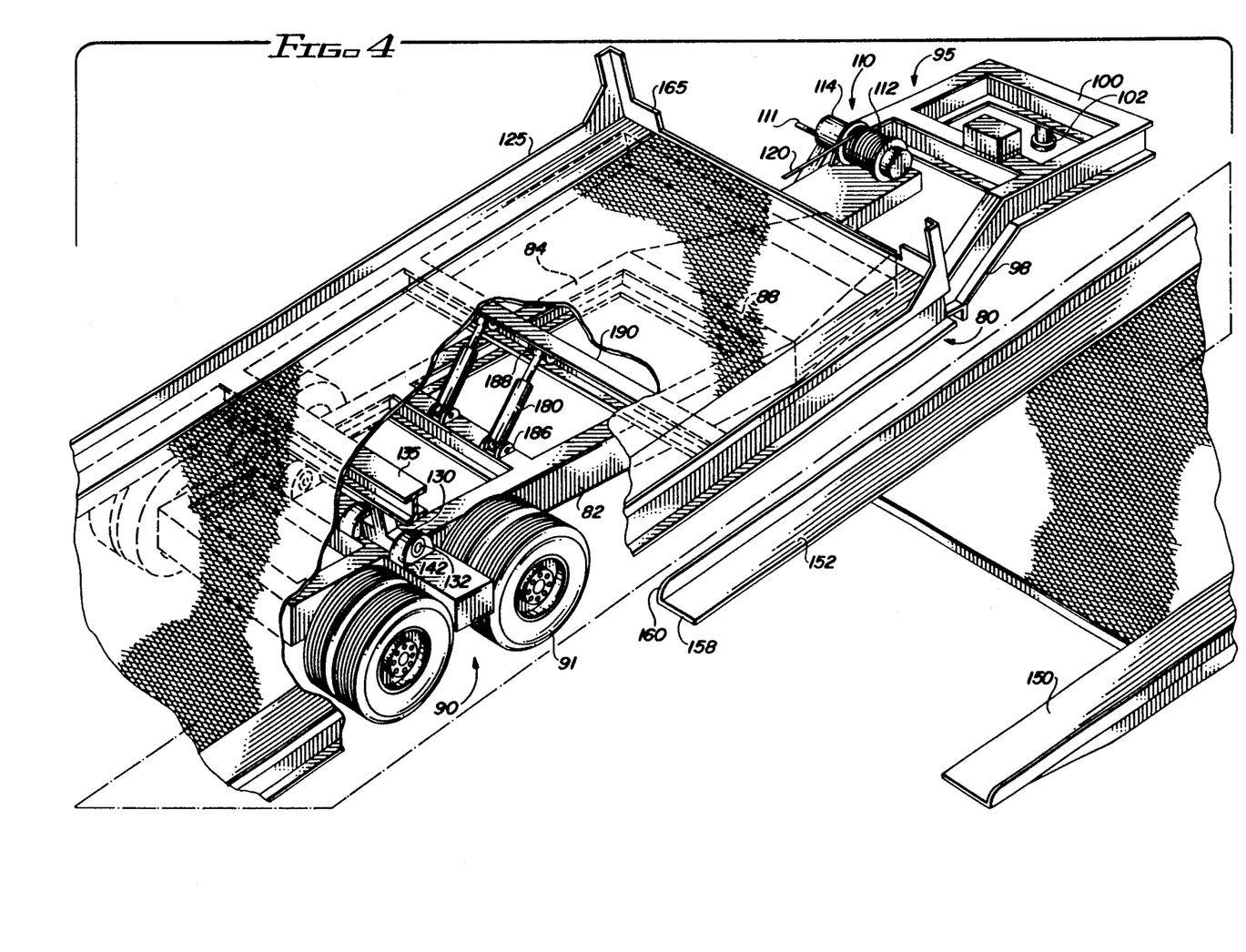
FIG. 4 is perspective view of the trailer partly broken away to better illustrate the components.

The trailer is best shown in FIG. 4 and includes a main, fixed chassis 80 having a pair of spaced-apart longitudinally extending side members 82, 84 at opposite sides of the fixed frame.

The main stationary chassis or undercarriage 80 supports a tilt bed or frame 125. A plurality of transversely extending structural members 88 extend between the side channels or members. The undercarriage or stationary frame is supported on a wheel carriage assembly 90 having pneumatic tires 91. Tandem dual wheel arrangements are shown on either side of the trailer. Normal safety equipment such as a braking system and brake lights are also provided and are not shown in the interest of clarity.

The forward end of the chassis 80 defines an elevated platform 95 formed from suitable structural members and elevated above the chassis by side frame members 98. One or more transversely extending structural members 100 extend between the sides of the platform. The underside of the platform carries a connection 102 to releasably attach the trailer to the truck 16. Connection 102 is shown as a downwardly depending king pin to permit the tractor to pull the chassis. Other types of couplings may be utilized.

The platform also carries a winch assembly 110 having a cable drum 112 reversibly driven by motor 114. Motor 114 may be electric, hydraulic or pneumatic. As shown, motor 114 is hydraulic and may be connected to the vehicle hydraulic system by suitable quick connect couplings. A control lever 111 serves to control the operation of the motor and directional rotation of the drum. Cable 120 is reeved about the cable drum and the free end of the cable carries a J-hook 118. As will be more fully explained hereafter, the J-hook is attachable to bracket 40 on the front wall of the container to load the container onto the trailer and to control the off-loading.

The tilt frame 125 is pivotally connected to the main chassis at pivot connections 130. Pivot connections 130 include a pair of transversely extending shafts 132 depending from cross frame members 135 of the tilt frame. The opposite ends of each of the pivot shafts are secured in trunnions 142. The longitudinal location of the pivot connections is selected so that the tilt frame will begin to pivot towards a towing position when a container reaches the approximate position over the wheel carriage shown in drawing FIG. 2C.

The tilt trailer includes oppositely disposed rails or ramps 150 and 152 which extend rearward beyond the main chassis. In the loading and unloading position, the end of the ramps each have a platform section 158 which engages the ground. The ramps are parallel and spaced apart a distance corresponding to the width of the container so that the rollers 50 at opposite sides of the container align with and will move along the rails. A small vertical edge 160 extends along the outer edge of each of the rails to serve as guide for the container and rollers and to prevent the container from slipping off of the guide rails. Upright stops 165 are provided at the forward corner of the tilt trailer to engage the forward end of the container in the fully loaded position.

Figure 1:
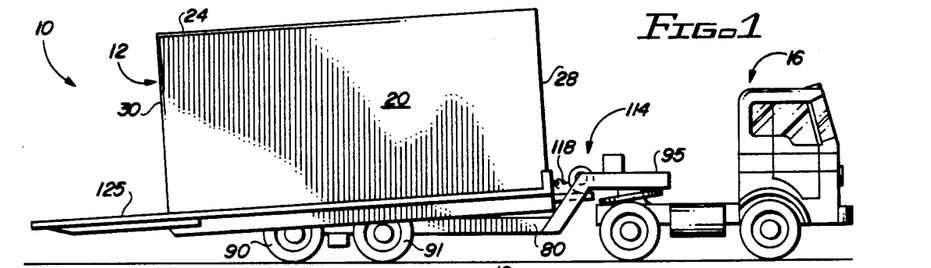
FIG. 1 is a side elevational view of the trailer system of the present invention with a storage container on the trailer in a loaded position in which the container and trailer may be towed.
Figure 2A:
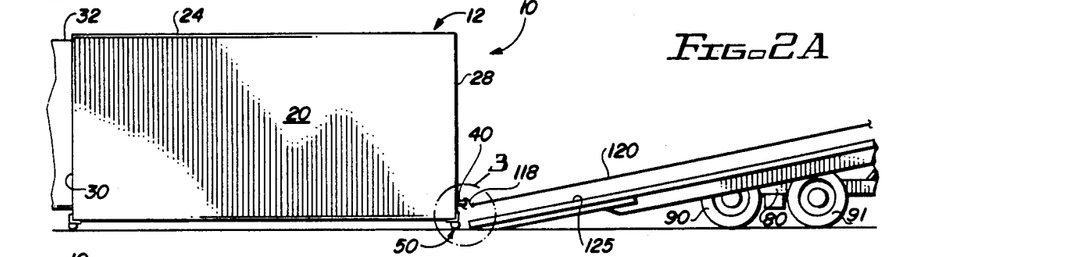
FIG. 2A is a partial side elevational view showing the trailer in a rearwardly tilted position attached to a container about to be loaded on the trailer.
Figure 2B:
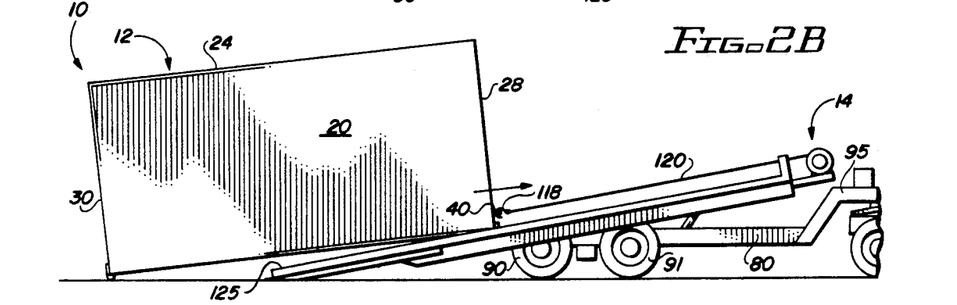
FIG. 2B is a view similar to FIG. 2A illustrating the container being pulled forwardly in a partially loaded condition.
Figure 2C:
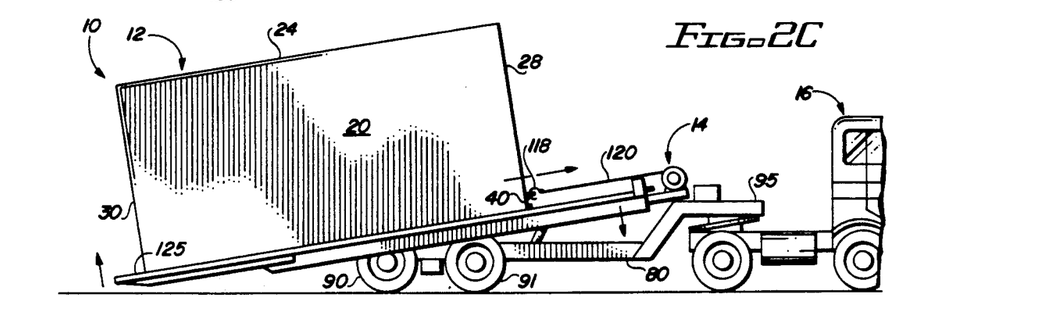
FIG. 2C is a view similar to FIG. 2B showing the container attached to the winch in a partially loaded position at which position the tilt frame of the trailer will automatically begin to return to a normal towing position.

One or more hydraulic cylinders 180 are pivotally mounted between the frame of the chassis and the tilt trailer. The hydraulic cylinders are shown as having their head ends pivotally connected to the chassis at clevis 186 and the rod ends pivotally connected at a clevis 188 to cross member 190 of the tilt frame. The tilting movement of the tilt trailer is controlled as hydraulic fluid bleeds between the internal chambers within the cylinder. Further, in the fully loaded, towing position shown in FIG. 1, it is noted that the hydraulic cylinders serve as stop members to maintain the tilt trailer in a slightly rearwardly inclined position in the towing position. For example, in the towing or transport position as shown in FIG. 1, the tilt trailer is rearwardly inclined approximately 7°. In the loading and unloading position as shown in FIGS. 2B and 2C, the tilt trailer is rearwardly inclined approximately 10°-15° with the platform portions 158 at the end of the ramps 150, 152 engaging the ground.

The present invention will be better understood from the following description of operation. Referring to FIGS. 1 to 2C, the truck and trailer is shown in various operational modes. In FIG. 1, container 12 is loaded onto the trailer and is in the normal towing position with the tilt frame 125 slightly rearwardly inclined but well above the road surface for transportation. When the truck is driven to the site where the container is to be used, as for example, in residential use, the container may be left in the driveway or on the street. At this point, the operator will disengage the winch drive 114 so that the cable drum is rotated to pay-out cable 120. Since the tilt trailer is slightly rearwardly inclined, gravity will cause the container 12 to roll rearwardly on roller assemblies 50 along the opposite side rails. The container will continue to move rearwardly until it reaches the position shown in FIG. 2A. At this point, the J-hook 118 may be disengaged from the bracket 40 at the front end 26 of the container and the container left in position on site for loading by the user. The cable drum may be reversely operated to take-up the cable and the cable secured in place. The tilt frame 125 is manually returned to the tilted position free of its load and if desired, locked in this position.

Figure 5:
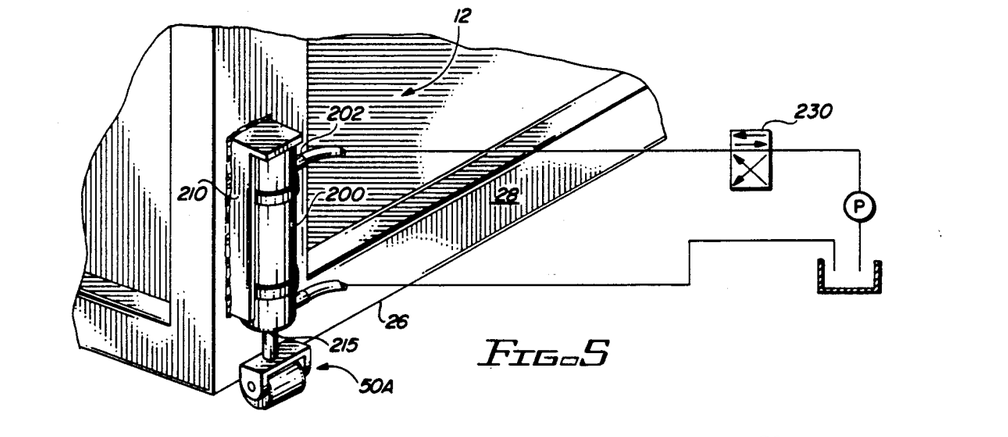
FIG. 5 is a partial perspective view of an alternate embodiment of the container elevating arrangement having hydraulic power means associated therewith for operatively raising and lowering the rollers, the hydraulic system being shown schematically.
Figure 6:
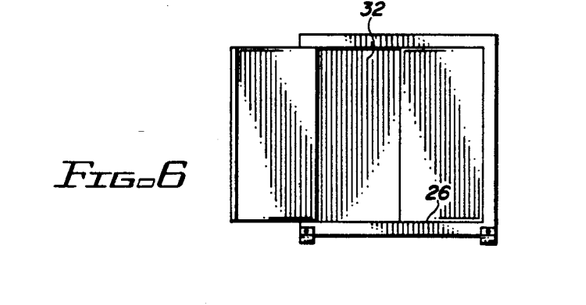
FIG. 6 is a rear view of the container.

The operator will then manually jack-up the front and rear ends of the container respectively, removing each of the roller assemblies 50. A manual jack 70 may be used for this purpose. This is easily accomplished by removing retainer 65 once the container is elevated and manually removing the rollers. The container is then returned to a ground-engaging position. The removal of the rollers allows the container floor to be positioned only a few inches above the supporting surface for convenience of loading as best seen in FIG. 5. When the rear doors are opened, the elevation of the container floor 26 is such that in most cases ramps will not be needed to load items into the trailer. The elimination of an elevated floor makes the task of loading the container much easier and much more convenient.

When the container is loaded, the user contacts the moving operator and the tractor or truck 16 is returned to the residence location. The trailer which is connected to the truck at king pin connection 102 is placed in alignment with the container with the rear platform 158 of the ramps immediately adjacent the front of the container. The cable 120 is paid-out and the J-hook connected to the bracket 40 at the front end of the container. The front end of the container is raised by jack 75 and the roller assemblies 50 replaced at the respective front corners of the container and secured in place by retainer 65. The procedure is repeated at the rear of the trailer and roller assemblies 50 secured to the rear corners of the container. The tilt frame may be manually moved to the rearwardly inclined loading position shown in FIG. 2B.

The operator then operates the drive motor 114 to cause the cable 120 to be wound about the cable drum drawing the container 12 forwardly onto the ramps 150, 152. The container is moved forward as shown in FIG. 2C with the front rollers engaging the guide rails and the rear rollers engaging the ground. At the position shown in FIG. 2C, the container is fully engaged on the tilt frame and as the container moves past the over-center position shown in FIG. 2C, the weight of the container will cause the trailer to tilt forwardly to the tow position with the tilt frame out of contact with the roadway surface. The hydraulic actuators 180 will dampen the downward tilting movement of the tilt trailer. The cable is wound until the container is in the full-forward position engaging the stops 165 at the front end of the tilt trailer. The truck may now be driven to move the container to its desired destination and at that point, the container may be unloaded in the manner described above.

In FIG. 5, the manually attachable roller assemblies 50 have been replaced with hydraulically actuable roller assemblies 50A. As shown in FIG. 5, a hydraulic cylinder 200 is mounted in a generally vertical position by brackets 210 at each of the four corners of the container 12. Each of the hydraulic cylinders carries quick connection 202 which allows the cylinders to be connected to a source of hydraulic fluid, as for example, an auxiliary hydraulic system on the truck 16. The rod 215 of each of the cylinders carries the roller assemblies 50A. With the piston rod retracted, roller assemblies 50A are in a position out of engagement with the ground withdrawn above the plane of the underside of the floor 26 of the container. When the cylinder is extended, the rollers will move downwardly engaging the ground and lifting the container a slight distance above the surface. A suitable control valve 230 will be provided in the hydraulic circuit. When it is desired to again lower the container, the valve is reversed to release fluid to the reservoir allowing the cylinder rods and attached rollers to retract.

Figure 7:
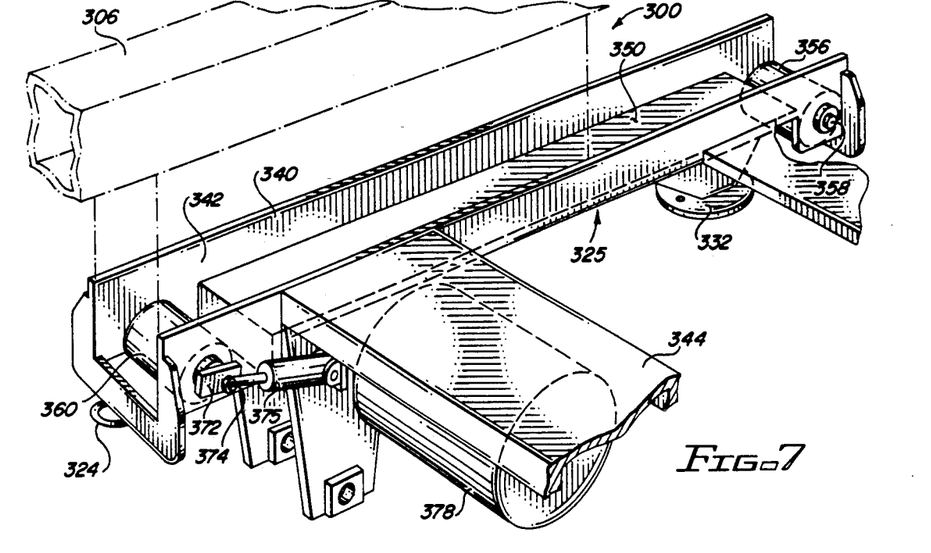
FIG. 7 is a partial perspective view illustrating an alternate embodiment of the present invention in which a selectively actuable roller system is interposed between the undercarriage and the tiltable trailer frame.
Figure 7A:
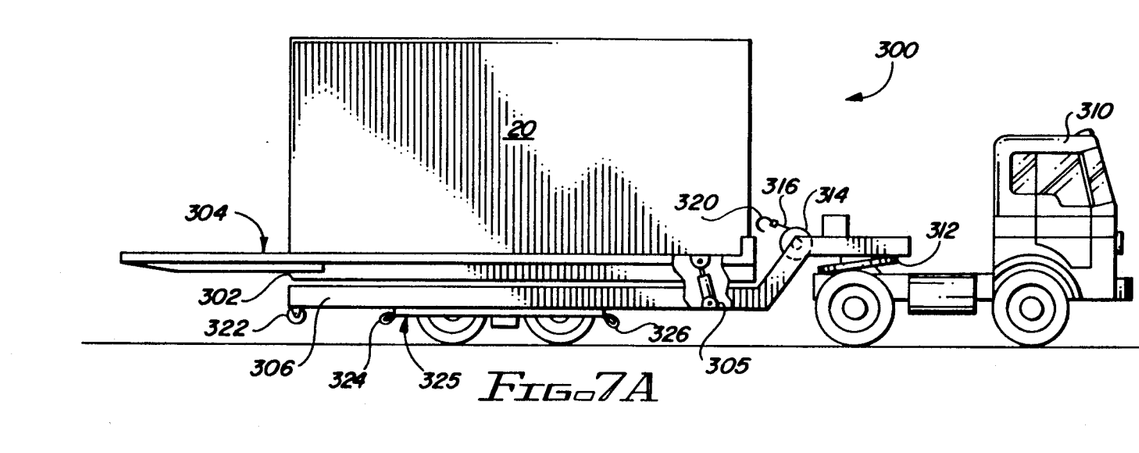
FIG. 7A is a side elevational view of a tiltable trailer provided with roller systems as shown in FIG. 7.

FIGS. 7 to 10 show an alternate arrangement for the tiltable trailer assembly. As best seen in FIGS. 7 and 7A, the tiltable trailer assembly is generally designated by the numeral 300 and includes an elongate tiltable trailer frame 302 having a bed or platform 304 for supporting the load. A pair of channels or rails 306 extend longitudinally beneath the bed to support it at opposite sides of the bed. The frame 302 is tiltable relative to channels 306 by means of hydraulic or pneumatic actuator 305. The trailer is connectable to a truck 310 at a conventional hitch 312 located at the front of channels 306. The truck carries a winch assembly 314 having a cable 316 which is windable on a motorized drum. The end of the cable carries a J-hook 320 which may be connected to the wheel assembly 325. The wheel assembly is disposed beneath the trailer frame and the wheel assembly is slidable relative to the axle assembly as will be explained. The wheel assembly has one or more axles and wheels with bellows or other shock absorbing means 332 interposed beneath the frame.

The winch 314 provides the motive power to slide the wheel assembly relative to tilt frame 302 by connecting the cable J-hook to either connector 326 at the forward end of the assembly or to connector 324 at the rear end of the wheel assembly. In the event the cable is to be connected to the rear of the wheel assembly at connector 324 to move the axle assembly rearwardly relative to the trailer, the cable is extended over a pulley 322 positioned at the rear of the trailer. The winch may be provided as part of the trailer as shown or may be mounted on the truck.

In FIG. 7, the roller assembly is shown in connection with a portion of the wheel assembly. The wheels have been omitted for clarity and elongate channel 306 which supports the trailer bed is shown in dotted lines. FIG. 7 illustrates the roller assembly as applied to one side of the trailer, it being understood that a roller assembly as shown in FIG. 7 is associated with a supporting channel similar to 306 disposed at the opposite longitudinal side of the trailer.

The wheel assembly includes a generally elongate frame member 340 defining an upwardly opening channel 342. Frame member 340 is secured to cross members 344 of the wheel assembly. Bellows or other shock absorbing means 332 are provided.

Figure 10:
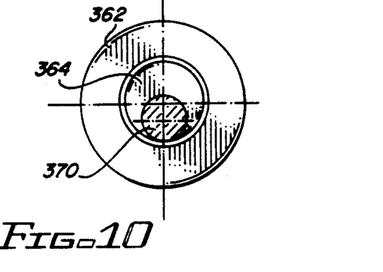
FIG. 10 is an end view of the roller shown in FIG. 9.

The channel 342 has a horizontally extending bottom surface 350 on which the longitudinal member 306 rests in the normal transport position. A box-like structure 354 is located at the forward end of the channel 340 and receives a fixed roller 356 which is mounted for rotation on transversely extending axle 358. The diameter of the roller is selected so that the outer surface of the roller is disposed slightly below the plane in the surface 350 of the channel 340 in a normal position. Another roller 360 is mounted at the rear end of the channel 342 extending between the side walls of the channel. Roller 360 has an outer annular bearing member 362 rotative about concentric shaft 364. The one end of the shaft 364 extends axially outward from the roller assembly at 365 and is rotatively secured to side wall 340 at bearing plate 368. A stub shaft 370 extends from the opposite end of shaft 364 which stub shaft is radially offset from the center of shaft 364 as illustrated in FIG. 10.

Shaft 370 is secured to a crank member 372. Crank member, in turn, is secured to the outer end of piston rod 374 which is extendable and retractable from cylinder 375. Cylinder 375 may be pressurized to extend rod 374 and is connectable to any suitable source such as air tank 378. The cylinder could also be operable from the pneumatic system of the truck by means of suitable quick connectors.

Figure 8:
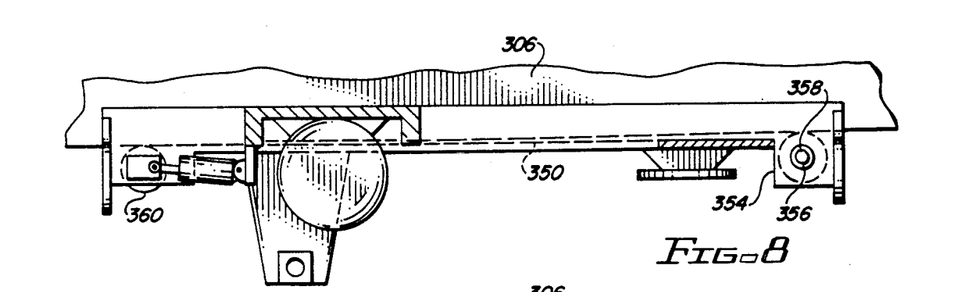
FIG. 8 is a side elevational view of the roller system shown in FIG. 7 with the roller positioned in the non-actuated position.
Figure 8A:
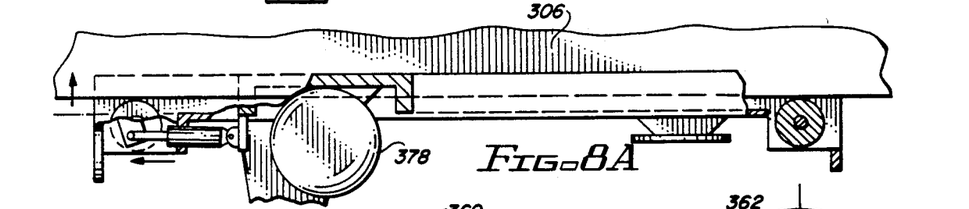
FIG. 8A is a view similar to FIG. 8 with the roller system shown in actuated position.
Figure 9:
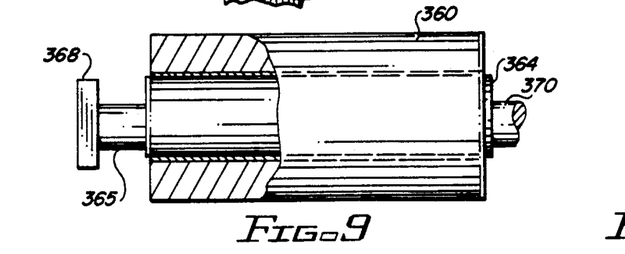
FIG. 9 is a front view partly in section of the moveable roller.

As seen in FIG. 8, in the retracted position, roller 360 is positioned with the outer surface of the roller spaced away from the bottom surface of channel 306. When cylinder 375 is pressurized to extend rod 374, the eccentricity of the roller will cause the roller to engage the bottom surface of the channel 306 lifting it slightly. Elevation of the channel will also cause the channel to come into contact with forward roller 356. In this position as shown in FIG. 8, the tilt frame 302 is now supported on rollers 356 and 360 and the wheel assembly may be easily moved in a forward or rearward direction for loading, unloading or redistribution of the carried load relative to the wheel assembly.

A better understanding of the advantages of the tiltable trailer system as shown in FIGS. 7 to 10 will be had from the following description of operation. The system is particularly useful in items stored in containers such as container 20 shown in FIG. 3. In the loading sequence, the truck 310 is connected to the trailer as shown in FIG. 7A. The trailer is then transported to the loading site and cylinder 375 is pressurized to raise eccentric roller 360 to support the tilt frame 302 on the rollers. The wheel assembly is moved forward by means of winch 314 by extending the cable and attaching the winch to the forward connector 326. The winch will move the wheel assembly forward relative to the tilt frame allowing the wheel assembly to easily move on the rollers. Once the wheel assembly is in the proper position, the trailer frame may be tilted rearwardly by cylinder 305 with the rear end of the trailer engaging the ground to facilitate loading. The load housed in containers such as containers 20 as shown in FIG. 1, may be attached to the winch and moved onto the trailer to further facilitate loading. Rollers such as those shown in FIG. 3 may be temporarily mounted on the container 20 during the loading operation. Once the trailer is loaded, the trailer is returned to a horizontal position and the winch is connected to the wheel assembly at forward connector 326. The eccentric roller 360 is actuated to bring the channel 306 into engagement with both the fixed and eccentric roller. The wheel assembly is pulled forward along the trailer frame to a location where the load is balanced for transportation.

The unloading operation is similar. Once the trailer has been transported to the unloading site, the eccentric roller 360 is actuated by pressurizing cylinder 375 to place the trailer frame in contact with rollers 356 and 360. The wheel assembly is pulled forward and the trailer is rearwardly tilted by means of hydraulic cylinder 305. The individual containers 20 are elevated on rollers and preferably the J-hook of the winch is attached to the individual containers to control the speed of the containers as they are rolled off the trailer under the influence of gravity. When the operation is completed and the trailer has been unloaded, the trailer is leveled and the wheel assembly is returned to an intermediate trailering position by connection to the winch. Once the wheel assembly is in the proper position, the eccentric roller is actuated to disengage the rollers from the trailer support channels 306.

FIGS. 20 through 23C illustrate an alternate embodiment of the roller assembly which are detachably securable to the individual load containers 20. The roller assemblies are generally designated by the numeral 400 and for purposes of attachment of the roller assemblies the opposite lower edges of the front wall of the containers are provided with keyhole-shaped slots 402 which are adapted to removably receive the roller assembly 400. The roller assembly has a generally channel-shaped body having a rear wall 404 and opposite side walls 406 and 408. A stud 403 projects from rear wall 404. A wheel 410 is rotatably mounted on axle 412 supported on U-shaped bracket 414. U-shaped bracket 414 includes a plate 416 which is vertically slidable within the body member. An abutment plate 420 extends transversely within the body member defining an area 422 for removably receiving a bottle jack 425. It will be apparent that when the bottle jack 425 is placed in the area 422 in engagement with opposite abutment 420 and bracket 414, extension of the bottle jack will cause the wheel 410 to move downwardly. The roller assembly is detachably secured in place on the container by positioning stud 403 in slot 402 of the container. The upper end of the roller assembly is secured to a bracket 435 spaced above and vertically aligned with slot 402. A toggle assembly 450 is secured to the housing of the roller assembly having an arm 452 which terminates at a hook 454 in engagement with bracket 435. The toggle is actuated by lever 464.

Figure 23A:
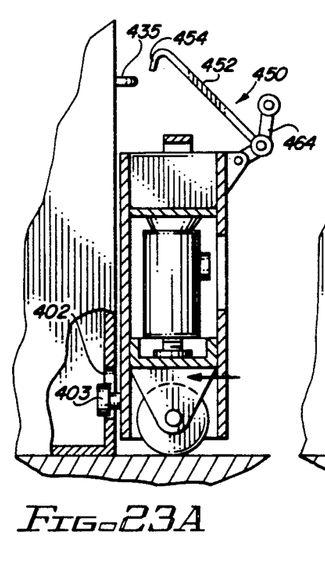
FIG. 23A–23C are views similar to FIG. 22 sequentially showing the detachable roller attached to a container and actuated to lift the container.
Figure 23B:
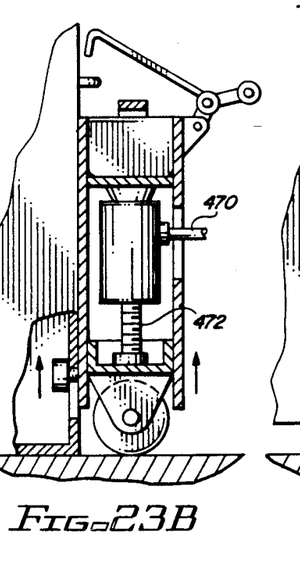
Figure 23C:
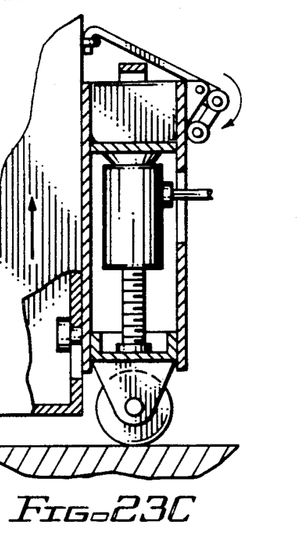

Container 20 may be elevated by the roller assembly as shown in FIGS. 23A to 23C. A roller assembly 400 is secured to the container at each corner at slot 402 and bracket 435 by engaging hook 454 in the bracket 435 and moving the toggle lever 464 downward passing over center position completing the locking operation. As seen in FIG. 23B, actuation of the bottle jack 425, either manually or by connection to a source of hydraulic fluid at conduit 470 will extend the wheel. Typically the source of hydraulic pressure will be a portable hydraulic unit. Further pressurization of the bottle jack 425 will cause the jack shaft 472 to extend moving the wheel downwardly causing the container to elevate as shown in FIG. 23C. Release of pressure from the bottle jack will allow the wheel to retract to a position where the roller assemblies 400 may be removed from the container.

The advantage of this system is that each container does not have to be equipped with dedicated and expensive roller arrangements. The roller assemblies are detachable and portable and may be attached when necessary permitting them to be re-used reducing capital expense. Also, since the units are portable they are less subject to damage which may occur during transportation.

Figure 24A:
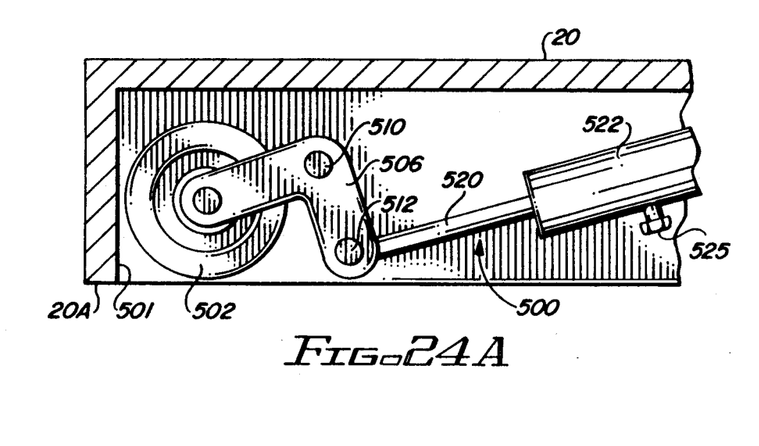
FIGS. 24A and 24B show still an another alternate embodiment of the present invention in which a container roller is integrally positioned and recessed under the container with FIG. 24A illustrating the roller in a retracted position and FIG. 24B illustrating the roller in an extended position.
Figure 24B:
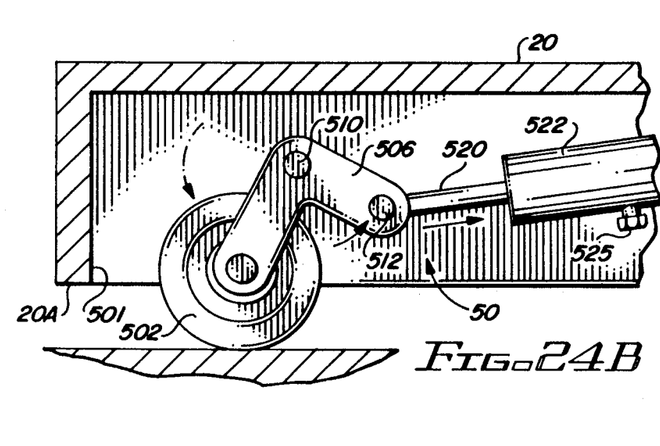

Whereas the arrangement shown in FIGS. 20 to 23C provides a detachable container roller assembly, it may be advantageous in some installations to provide a roller assembly for lifting the container which assembly is an integral part of the container. This is particularly true of containers 20 of the type used for sea cargo. Referring to FIGS. 24A and 24B, a portion of the container 20 is shown which is representative of an area of a container 20 at the corner of the container. The underside or floor of the container is represented by the line 20A. A recess 501 is formed at the corners of the container extending or opening to the floor 20A to house the roller assembly 500 to protect it from damage and permit it to be placed in an out-of-the-way position. The recess houses a roller assembly 500 which includes a wheel 502 supported on an axle 504 extending transversely through the wheel. The opposite sides of the axle 504 are secured to L-shaped brackets 506. L-shaped brackets 506 are pivotable about pivot shaft 510 extending to the opposite side walls of the recess. The outer or distal ends of the L-shaped brackets are interconnected to a clevis 512 pivotally attached to rod 520 of actuator 522. Actuator 522 may be hydraulic or pneumatic actuator connectable to a source of motive fluid at conduit 525.

FIG. 24A shows the retracted position of the roller. Upon pressurization of actuator 522, rod 520 will move leftward as shown causing the L-shaped brackets to pivot about pivot points 510 which, in turn, will move axle 504 and wheel 502 downwardly causing the container to be elevated above the supporting surface as shown in FIG. 24B. The embodiment of the rollers shown in FIGS. 24A and 24B would be particularly adaptable to containers such as heavy sea containers which when they are to be moved along a surface, can be connected to a suitable portable source of fluid pressure. An advantage of the embodiments shown in FIGS. 24A and 24B is that the roller assembly is recessed when in the stored position which prevents damage to the mechanical components.

As indicated above, the present system is particularly adaptable for loading, unloading and transporting containers, particularly larger containers such as sea cargo or moving containers. Generally these containers will vary in size but generally approximately 8' wide and 10' to 40' length. Containers of this type are suitable for moving both household items and personal belongings as well as commercial freight. One particular problem moving personal items is the containment of such items during transportation. Traditionally, items such as china, clothing and the like are packed into disposable cardboard boxes which are unloaded at the designated location and are often discarded. This is a wasteful and ecologically unsound procedure. Accordingly, FIGS. 11 through 19 show a system which has a plurality of reusable boxes or cartons which may be conveniently stored within the larger transportation containers 20. Thus, to facilitate a household move, the large container 20 would be transported to the loading site using a tiltable trailer as shown in FIG. 7A and conveniently unloaded. The homeowner or mover would then pack the reusable boxes and load them in the larger container 20. When the large container is filled, the tiltable trailer is returned to the loading site and the container 20 is loaded onto a trailer and transported to the unloading or storage location.

Figure 17A:
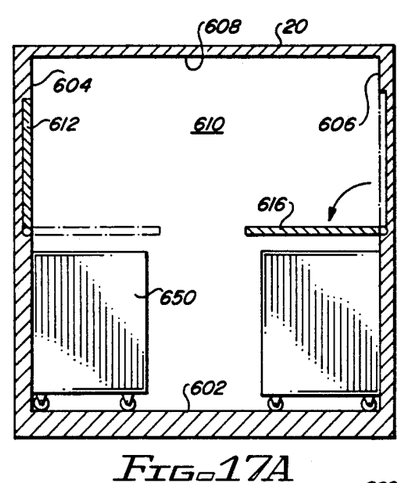
FIG. 17A is an end view of a container shown partially loaded with storage boxes.
Figure 17B:
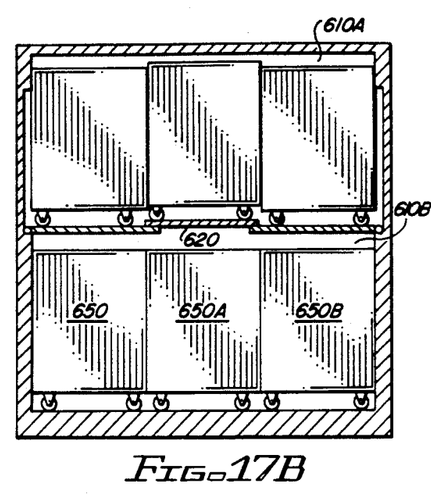
FIG. 17B is an end view of a container shown fully loaded with storage boxes.

FIGS. 17A and 17B show an end view of a typical transportation container 20 which is indicated as generally 8' wide and 8' high and may vary in length from 10' to 40'. The container 20 has a interior floor 602, opposite interior side walls 604 and 606 and interior top wall 608 defining the storage area 610. Each of the side walls 604 and 606 define a generally longitudinally extending recess 612. A fold-down shelf 616 is pivotally secured at each side wall at the lower end of recess 612. The shelves 616 may be folded to an out-of-the-way position in the respective recesses or folded to a position as shown in FIG. 17B, generally perpendicular with respect to the container side walls horizontally subdividing the storage area to an upper area 610A and a lower area 610B. In the fold-down position, a bridge 620 may be inserted to extend between the fold-down shelves.

Figure 18A:
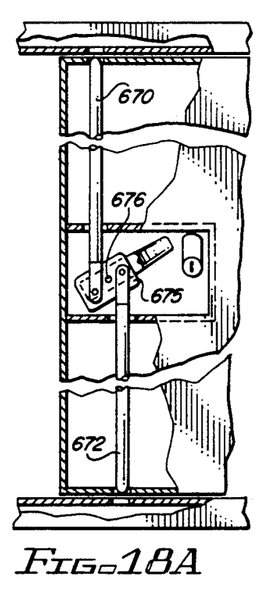
FIG. 18A is a sectional view taken along line 18—18 of FIG. 11 showing the storage box door in an open position.
Figure 18B:
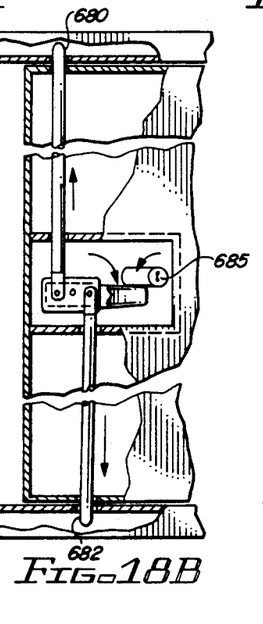
FIG. 18B is a view similar to FIG. 18A showing the storage box door in a locked position.

The present system utilizes a plurality of reusable boxes for the temporary storage of items, particularly household items and personal items. A representative box is designated by the numeral 650 and is best seen in FIGS. 11 through 16. The box is constructed of wood, metal or plastic being generally rectangular in cross section shown having side walls 652, 654, rear wall 656, top wall 658 and floor 660. The boxes are preferably supported on lockable casters 655. The front wall 654 defines a generally rectangular opening and the interior storage area 662 is accessible by means of doors 664 and 666 which are hinged at their outer vertical edges to the box. The doors 666 and 666 are lockable by any convenient arrangement such as that shown in FIGS. 18A and 18B. As shown, each door is provided with a vertically extending pair of locking bolts 670. The locking bolts may be extended or retracted by means of handle 675 which is rotatable about pivot 676. The retracted position is shown in FIG. 18A and the extended or locked position is seen in FIG. 18B. In the extended position, the handle 675 has been rotated downwardly extending the bolts into apertures 680 and 682 in the front wall 654 to lock the doors. A key-actuated lock 685 may be rotated into engagement with the handle to prevent unauthorized opening of the doors.

The boxes 650 are of predetermined size so that a predetermined number of the boxes will fit within the interior of the container. As seen in FIG. 17B, the individual boxes are sized so that the boxes may be arranged in two tiers, one supported on the floor of the container and the other on the intermediate support formed by the downwardly folded shelves 616 and the bridge 620. The boxes are also shown as being sized so that three boxes 650, 650A and 650B may be placed across the width of the storage area, although the number may be varied.

Figure 14:
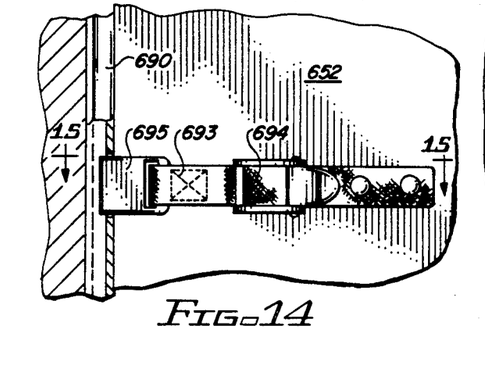
FIG. 14 is a partial side view of the storage box shown in a secured position within the trailer.
Figure 15:
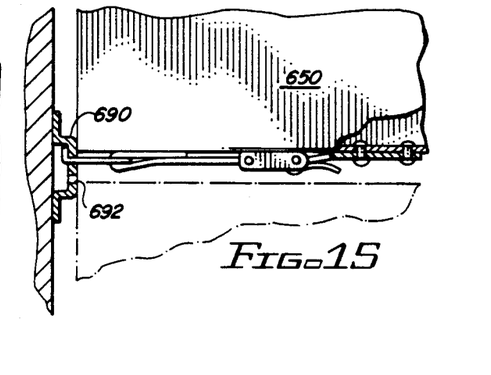
FIG. 15 is a sectional view taken along line 15—15 of FIG. 14.
Figure 16:
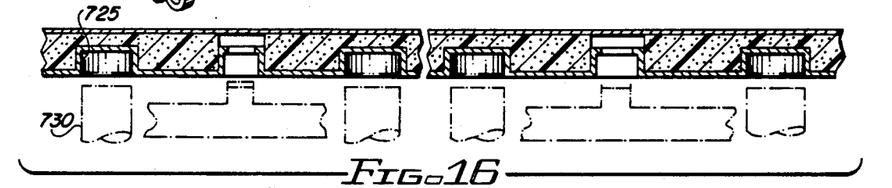
FIG. 16 is a sectional view taken along line 16—16 of FIG. 11.

The boxes are held in place by securing the boxes to the interior container wall. For this purpose, the opposite vertical walls of the container 20 are provided with spaced-apart channels 690 as shown in FIGS. 14 and 15. The channels define a plurality of spaced apart apertures 692. Attachment straps 693 are secured at the outer side of the opposite side walls 652 and 654 of the boxes. Each of the straps has a buckle 694 which will tighten the strap by reducing the overall length. Such buckles are conventionally known. The distal ends of the straps carry a hook 695 which is engageable in the aperture 692 in the rail. Thus, as shown in FIGS. 14 and 15, the boxes may be secured to the wall of the containers to restrain movement.

The interior of the boxes are designed to facilitate storage of individual items, smaller boxes as well as permitting storage of hanging items such as clothing eliminating the need for wardrobe boxes.

Figure 11:
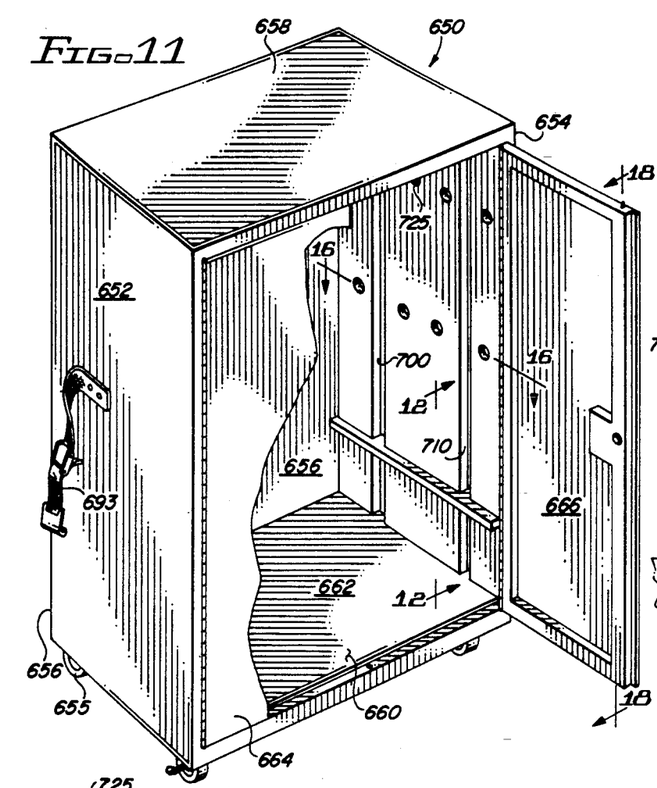
FIG. 11 is a perspective view illustrating a storage box which is a component of a moving system which is adaptable for use with the tiltable trailer system.
Figure 12:
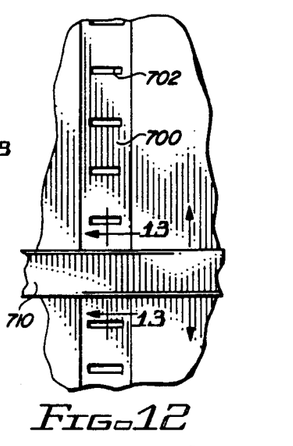
FIG. 12 is a sectional view taken along line 12—12 of FIG. 11.
Figure 13:
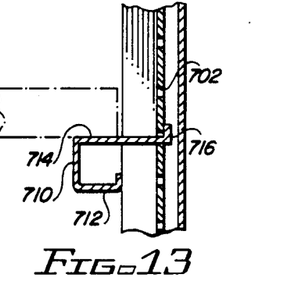
FIG. 13 is a sectional view taken along line 13—13 of FIG. 12.

As seen in FIGS. 11 to 13, the opposite interior side walls of the boxes 650 are provided with vertically extending rails 700 each of which define a plurality of regularly spaced-apart apertures 702. Horizontally extending shelf supports 710 are selectively engageable along the rails 700. As seen in FIG. 13, the shelf support includes a horizontal channel member 712 having upper leg 714 which supports the shelf. Leg 714 terminates at its distal end at a lip 716 which is engageable in the slot 702 in the rail. Thus, the shelf support may be variously positioned to accommodate various articles.

Figure 19:
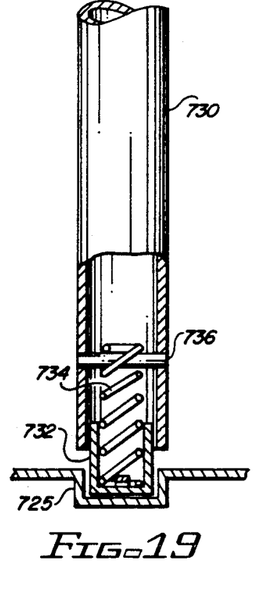
FIG. 19 is a detail view, partly in section showing a hanger rod engaged with a wall of the storage box.
Figures 20, 21, 22:
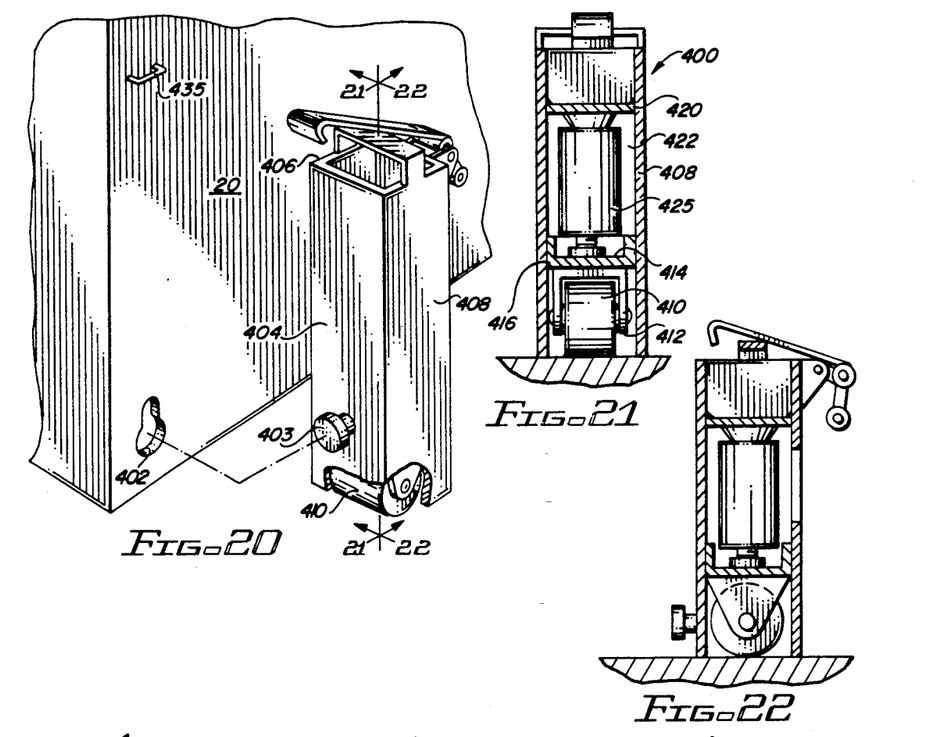
FIG. 20 is a perspective view of an embodiment showing an alternate construction for the removable rollers attachable to the container.
FIG. 21 is a sectional view taken along line 21—21 of FIG. 20.
FIG. 22 is a sectional view taken along line 22—22 of FIG. 20.

In the event the user wishes to hand clothing items or similar items within the box, the opposite side walls define a plurality of spaced apart blind bores 725. Cylindrical hanger rods 730 are selectively engageable at various locations in the bore 715. As seen in FIG. 19, the cylindrical hanger rods are provided with an end cap 732 at opposite ends which cap is sized to be received within the bores 725. The end cap houses a spring 734 which abuts against a pin 736 to apply an outwardly biasing force on the cap so the hanger rods may be positioned as desired for hanging clothes and other items.

The storage system is particularly adapted for use with the tiltable trailer of the present invention. The storage boxes 650 can be delivered to the moving site and left to be packed along with the container 20. The trailer may also be left and the truck unhitched for use elsewhere. The boxes are packed and placed in the container and the truck may then return. The container is loaded on the trailer and the trailer is then returned to a transport position and the wheel assembly suitably positioned so the load may be transported to the delivery site. The boxes are reusable eliminating the waste that occurs when conventional cardboard boxes are discarded. The boxes may serve as temporary storage.

From the foregoing, it will be appreciated that the transport vehicle system of the present invention facilitates convenient transfer of large heavy cargo containers between a truck chassis and a work area without the requirement and expense of special lifting equipment. Moreover, such loading and unloading may be accomplished by the driver of the truck so as to reduce labor costs attendant to the operation. Furthermore, the towable trailer is efficient and of simple design, making it inexpensive to manufacture and to maintain. The operation of the device is simple and no expensive equipment is required for tilting the trailer between the loading, unloading and loaded positions as this is accomplished by gravity due to the position of the cargo container along the tilt trailer.

It will be obvious to those skilled in the art to make various changes, alterations and modifications to the container transport and loading system of the present invention. To the extent such changes, alterations and modifications do not depart from the spirit and scope of the appended claims, they are intended to be encompassed therein.

I claim:

1. A freight loading and transport system comprising:
   (a) a storage container having a storage area defined by walls and a floor;
   (b) wheels associated with said container having an operative position in which the container is supported on the wheels for rolling movement;
   (c) a trailer having a front and rear and supported on a wheel assembly;
   (d) a tiltable platform tiltable between a generally horizontal position and a rearwardly inclined position for loading and unloading;
   (e) bearing means interposed between said wheel assembly and said tiltable platform having a first transport position and a second position in which the platform is supported on the bearing means for movement of the wheel assembly relative to the platform whereby the wheel assembly may be moved to a predetermined position along said platform, said bearing means including a first eccentrically mounted roller and a second spaced-apart fixed roller and actuator means for moving said first eccentrically mounted roller to a position in which the platform is in the second position supported on said first and second rollers; and
   (f) power means for moving said wheel assembly relative to said tiltable platform whereby said tiltable platform may be selectively tilted for loading and unloading.

2. The freight loading and transport system of claim 1 wherein said wheels are carried on bracket means detachably securable to fastener means to said container.

3. The freight loading and transport system of claim 1 wherein said wheels are carried on retractable and extensible power means.

4. The freight loading and transport system of claim 1 wherein said power means comprises a drive motor in driving reversible engagement with a drum and cable means wound about said drum and being detachably and selectively securable to said container or to said wheel assembly.

5. The freight loading and transport system of claim 2 wherein said wheels include a housing having means for extending and retracting said wheels and wherein said housing removably receives a portable power source for extending and retracting the said wheels.

6. The freight loading and transport system of claim 1 wherein said wheels are located in recesses positioned in the floor of the container and further including means for extending and retracting said wheels from said recesses.

7. The freight loading and transport system of claim 1 further including a plurality of storage boxes securable in said storage area.

8. The freight loading and transport system of claim 7 wherein selected of said boxes have adjustable shelves therein.

9. The freight loading and transport system of claim 8 wherein selected of said boxes have removable hangers therein.

10. The freight loading and transport system of claim 7 wherein said storage area includes selectively positionable partitions whereby multiple tiers of boxes may be stacked therein.

11. The freight loading and transport system of claim 10 wherein said partitions comprise foldable panels attached to the walls of the storage area.

12. A freight loading and transport system comprising:
   (a) a storage container having a storage area defined by walls and a floor;
   (b) wheels associated with said container having an operative position in which the container is supported on the wheels for rolling movement;
   (c) a trailer having a front and rear and supported on a wheel assembly;
   (d) a tiltable platform tiltable between a generally horizontal position and a rearwardly inclined position for loading and unloading;
   (e) bearing means interposed between said wheel assembly and said tiltable platform having a first transport position and a second operative position in which the platform is supported on the bearing means for movement of the wheel assembly relative to the platform whereby the wheel assembly may be moved to a predetermined position along said tiltable platform, said bearing means comprising a first roller having an operative and a retracted position and a second spaced-apart fixed roller and actuator means for moving said first roller to an operative position in which the platform is supported on said first and second rollers; and
   (f) power means for moving said wheel assembly relative to said tiltable platform to position said tiltable platform for loading and unloading.

13. The freight loading and transport system of claim 12 wherein said actuator means comprises a pneumatic actuator.

* * * * *